UNITED STATES PATENT OFFICE.

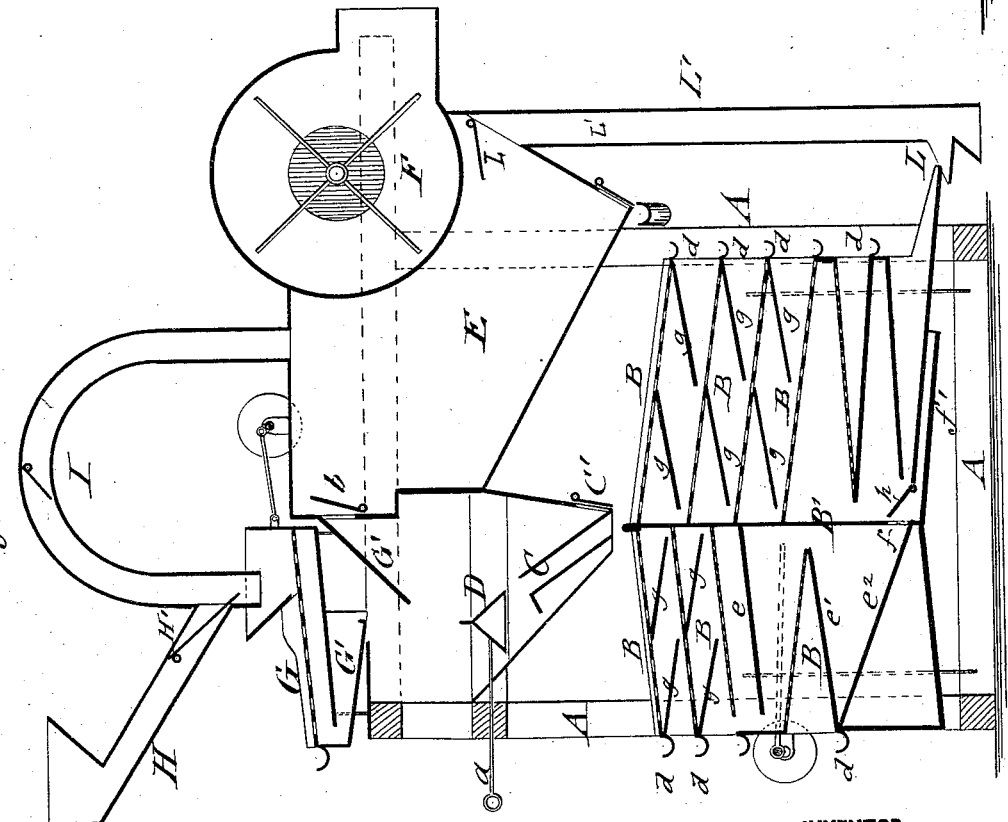

JOHN GORDON, OF ST. CATHERINE'S, CANADA.

IMPROVEMENT IN GRAIN-SEPARATORS.

Specification forming part of Letters Patent No. 157,321, dated December 1, 1874; application filed October 3, 1874.

*To all whom it may concern:*

Be it known that I, JOHN GORDON, of St. Catherine's, in the province of Ontario, Dominion of Canada, have invented a new and Improved Reciprocating Winnower, of which the following is a specification:

In the accompanying drawing, Figure 1 represents a vertical longitudinal section on the line $c\ c$, Fig. 2, of my improved reciprocating winnower; Fig. 2, an end view of the same.

Similar letters of reference indicate corresponding parts.

The invention relates to reciprocating winnowers for separating wheat from grain, cockle, and other impurities, and will be pointed out in the claim, after being fully described.

The means by which I accomplish this will first be fully described, and then pointed out in the claim.

In the drawing, A represents the supporting-frame of my reciprocating winnower or fanning-mill. In the lower part of the same are arranged double series of inclined coarser and finer sieves B of suitable number, which are separated by a vertical transverse partition-plate, B', so as to form thereby two independent sets of sieves, for the purpose of separating the heavier and lighter kernels of wheat. A distributing-hopper, C, with partitions, and a movable divider, D, are arranged above the system of sieves, at one side of the partition-plate B', while the drop-chamber E and the suction-fan F is placed above the series of sieves at the other side of the partition. The mouths of the separating-channels of hopper C are placed above the partition-plate in such a manner that one discharges the heavier grain to the sieves at one side, the other the lighter grain to the sieves at the other side of the same. Above the distributing-hopper C is arranged, at the top part of frame A, a coarse sieve, G, for removing all straws, sticks, thistles, and impurities larger than a kernel of grain from the wheat. The wheat is fed to the top sieve by an entrance-spout, H, with regulating-gate H', and met, while falling from the same to the top sieve G, by a strong suction current of air, produced by the fan, which current is regulated by a suitable valve in the arched conductor I, for removing from the wheat all dust, chaff, or other light impurities, and conducting then the lighter particles through the drop-chamber E and fan discharge-spout to the outside, while depositing the heavier particles in the bottom part of the drop-chamber E. The wheat is conveyed over carrier-plates G', arranged below top sieve G, to the movable divider D, which is adjusted by guide-rods $a$ from the outside, for regulating the quantity of wheat to fall on each side of the system of sieves, the heavy kernels to one channel of hopper C and the lighter wheat and oats to the other channel, after having been separated on their passage from the carrier-plates G' by a strong current of air from the fan, regulated by a valve, $b$, in the wall of the drop-chamber and top sieve. The distributing-hopper C is provided with a third channel, with bottom valve C', through which the lightest kernels of wheat and oats are conveyed to the sieves as they accumulate thereon, opening the valve by their own weight. The system of sieves B, for separating the heavy wheat, consists, first, of two oat-sieves, for removing the oats and everything larger than a grain of wheat. The wheat passes through the two oat-sieves, while the oats are conveyed by inclined gutters $d$ at the end of the sieves and carried away. The wheat falls then on a finer sieve, for the purpose of removing cockles and small grain, which pass through the sieve on a carrier-board, $e$, while the wheat passes over another cockle-sieve to an inclined bottom carrier-plate, $e^2$, and then, by a bottom aperture, $f$, of the partition B and a bottom discharge-spout, $f'$, to suitable receiving receptacles. The cockles drop on the second cockle-sieve B and pass through the same to an outwardly-inclined carrier-plate, $e^1$, to be carried off by an inclined gutter, $d$, at the end thereof. Under each oat-sieve are arranged two return-boards, $g$, for the purpose of carrying the wheat on the next sieve, each return-board extending one-half the width of the sieve, and having at the end a small stop or rim for distributing the wheat evenly on each portion of the sieve. The lighter wheat falls on the system of sieves B, at the other side of the partition-plate B', and passes through three or more oat-sieves and one or more cockle-sieves, with carrier-plates and outer gutters, in the same manner and for the same purpose as in the system of sieves already described for the heavy wheat. The light wheat falls finally on a carrier-board, and is carried to a suction-channel, L, dropping, through an aperture at the bottom of the same, into a vessel placed to receive it, while the strong upward current in the suction-channel $L^1$, caused by the fan, and regulated by a top valve, $L^2$, removes all light kernels and any other impurities that may still remain in the wheat, carrying them partly through the fan discharge-spout and depositing them partly in the drop-chamber. The drop-chamber E is formed of inclined side walls, meeting under an angle at the lowermost point. In case the separation of the wheat into heavier and lighter grades is not desired, the heavy wheat may be made to fall, by a swinging bottom valve, $h$, through the bottom aperture $f$, on the carrier-board, for the light wheat, and be carried therewith to the suction-spout.

Having thus described my invention, what I claim as new, and desire to secure by Letters Patent, is—

The hinged valve or cut-off $h$, arranged to connect at will the carrier-board $e^2$, leading to discharge $f$, with the carrier-board leading into suction-channel $L^1$, as and for the purpose described.

JOHN GORDON.

Witnesses:
M. BRENNAN,
W. H. NETTLETON.